United States Patent [19]

Ford

[11] Patent Number: 4,684,255
[45] Date of Patent: Aug. 4, 1987

[54] INTERFEROMETRIC OPTICAL PATH DIFFERENCE SCANNERS AND FT SPECTROPHOTOMETERS INCORPORATING THEM

[75] Inventor: Michael A. Ford, Maidenhead, England

[73] Assignee: The Perkin-Elmer Corporation, Norwalk, Conn.

[21] Appl. No.: 760,013

[22] Filed: Jul. 29, 1985

[30] Foreign Application Priority Data

Aug. 9, 1984 [GB] United Kingdom ............... 8420233

[51] Int. Cl.$^4$ ............................................... G01J 3/45
[52] U.S. Cl. ............................................... 356/346
[58] Field of Search ............................................... 356/346

[56] References Cited

U.S. PATENT DOCUMENTS 4,142,797 3/1979 Astheimer ........................... 356/346

OTHER PUBLICATIONS

Sternberg et al., "A Newtype of Michelson Interference Spectrometer", *J. Sci. Instru.* vol. 41, pp. 225–226, 4/64.

Primary Examiner—Davis L. Willis
Assistant Examiner—Matthew W. Koren
Attorney, Agent, or Firm—Francis L. Masselle; Edwin T. Grimes; Ronald G. Cummings

[57] ABSTRACT

In an interferometric apparatus the path of the output beam of a rotary Optical Path Difference scanning assembly leading to an electrically responsive detector is maintained substantially fixed in space for any scan angle within predetermined limits, thus obviating a serious drawback of a prior art proposal wherein the output beam translates significantly over the detector face with changes in scan angle, with the result that the detector output is vitiated by totally spurious variations of the energy reaching it.

In one embodiment, the scanning assembly comprises a beam splitter having a semi-reflective layer the output face of which cooperates with the face of an output mirror normal thereto, the axis of rotation being substantially coincident with the line of intersection between the prolongation planes of the two faces. A Fourier Transform spectrophotometer embodying the assembly is also described.

17 Claims, 11 Drawing Figures

INTERFEROMETRIC OPTICAL PATH DIFFERENCE SCANNERS AND FT SPECTROPHOTOMETERS INCORPORATING THEM

BACKGROUND OF THE INVENTION

This invention relates to interferometric apparatus comprising a rotary scanner of the optical path difference between two optical paths, such as the two arms of an interferometer of the Michelson type, in particular a Michelson interferometer forming part of a Fourier Transform Spectrophotometer, the rotary scanner being such as to enable the beam outputted therefrom to remain substantially fixed in space for any angle of rotation within predetermined scanning limits.

It is believed that, although the phrase "optical path difference" and the related phrases "optical path length" and "geometrical path length" presently to be encountered are well understood in the interferometric art, it would be of assistance to the reader in appreciating their significance in the present context if they were distinguished from the outset.

We will distinguish first the phrases "geometric path length" and "optical path length", in which the path referred to is that followed by light rays between two points spaced along their travel or, more specifically, two spaced optical elements. The "geometrical path length" is simply the length, in any convenient units of linear measure, of the path through air, or any other medium, from one to other of said points. The "optical path length", on the other hand, takes into account the retardation effect on light waves of any intervening medium other than air. By definition, it is the product of the geometrical path length and the refractive index of the medium. The refractive index (usually denoted by the letter n) is in fact a measure of the retardation. If a light wave takes a time t to travel between two spaced points in air, it will take a time t×n to travel between the same two points when a medium of index n greater than 1 is substituted. If n=2, for example, the travel time is doubled.

It will be appreciated, therefore, that two light waves initially travelling in phase coincidence along two separate paths of the same geometrical path length (if no media other than air are included in the paths) or optical path length (if media other than air are present) are thrown out of step if one is retarded with respect to the other by increasing the geometrical path length or the optical path length, as the case may be, of one path with respect to the other.

A system of mirrors can clearly be used to change the geometrical path length simply by increasing or decreasing the distance travelled in air by the light rays. It follows that even where refractive elements are present the system will still alter the geometrical length of that portion of the overall path that passes through air and, therefore, it will alter the optical path length, in so far as the latter is derived from the former in the manner hereinbefore referred to.

Two optical paths may have the same geometrical path length and yet one path will cause greater retardation than the other if its optical path length is greater. On the other hand, equality of optical path lengths is always associated with equal retardations. This means that the phrase "optical path length" has greater generality and may conveniently be used in a context where refractive elements may or may not be involved.

As to the phrase "optical path difference", it simply relates to the difference in optical path length between two paths that may include media other than air. The phrase "geometrical path difference" is not often used, but after what has been said in the preceding paragraph, its meaning should be clear.

In the present context, the phrases "optical path length" and "optical path difference" (hereinafter frequently referred to and conveniently denoted by the initials O.P.D.) are intended to be associated with situations where the presence of media other than air is not to be excluded but not necessarily included.

In a basic Michelson-type interferometer, the radiation flux emanating from a source of monochromatic light, either in the visible or the invisible regions of the electromagnetic spectrum, impinges on a beam splitter after passing through a collimator. The beam splitter is oriented at an angle of 45 degrees to the direction of the incoming collimated beam so that a portion (i.e. percentage) of the impinging beam is transmitted without change of direction and a portion is reflected through a 90-degree angle. Each portion is reflected back towards the beam splitter by a beam reversing mirror, the return optical path being coincident with the forward path. At the beam splitter recombination of the two portions takes place, with the first now progressing in reflection and the second in transmission towards a common path leading to a light receiving device, which may be a screen or a photoelectric detector.

Now, if the optical path length between the beam splitter and one reversing mirror, which together represent one arm of the interferometer, is made identical with that between the beam splitter and the other reversing mirror, which together represent the other arm of the interferometer, the reflected and transmitted beams will suffer no relative phase changes and consequently will recombine at the beam splitter so as to be indistinguishable—if transmission losses and optical imperfections are notionally assumed to be zero and the beam splitter provides 50% reflection—from the unsplit optical beam.

If, on the other hand, an optical path difference that is significant compared with one half wavelength of the monochromatic light is established between the two arms of the interferometer, such as by moving one of the reversing mirrors towards the beam splitter, interference effects may be expected. The frequency of the resultant sine wave representing the recombined beam will be the same as that of the two constituent sine waves representing the beams prior to their recombination. The amplitude, on the other hand, will be the algebraic sum of the constituent sine waves amplitudes at each successive abscissa point and therefore will vary sinusoidally from a maximum, when the optical path difference is equal to an integral number of wavelengths, and, therefore, the amplitudes of the constituent waves add up (constructive interference), to a minimum, when the optical path difference is equal to an integral number of wavelengths plus one half wavelength and the waves are therefore in phase opposition so that the amplitudes subtract (destructive interference). A series of concentric rings (called interference fringes), representing the maxima and minima of the resultant sine wave, and therefore alternately bright and dark, may be viewed by interposing an ordinary white diffusing screen at the focus of a converging lens interposed in the path of the recombined beam, provided the monochromatic source radiates visible light.

Alternatively and more usefully, the optics of the interferometer may be arranged to project an image of the aperture stop (also called Jacquinot stop) of the interferometer at a photodetector having a circular window for admitting the central interference fringe (i.e. the first ring). This fringe will change from a light to a dark patch as the optical path difference undergoes a change equal to one half wavelength through the movable mirror being displaced between positions corresponding to constructive interference and destructive interference, respectively. The sinusoidal electrical output of the detector can be processed to provide an accurate linear measurement of the mirror displacement and, therefore, of any member suitably mechanically coupled to the mirror, to within a small fraction of one half wavelength. Displacements of exact half wavelengths can, of course, be measured by counting the mean level crossings of the output signal from an appropriate datum. Each crossing counted from the datum represents a change of O.P.D. of exactly half the wavelength of the source, i.e. a displacement of the member of exactly ¼ wavelength. When a monochromatic source is used the wavelength of which is known precisely, interferometric measurements of length as suggested are perhaps the most sensitive and accurate available to man.

A field of application predicted by Michelson for his interferometer, but only of comparatively recent application, is Fourier Transform spectroscopy (hereinafter FT stands for Fourier Transform). If the movable mirror referred to earlier is actually displaced between a position corresponding to zero O.P.D. and a predetermined limit by mounting the mirror on an accurate scanning assembly following a strictly rectilinear path, the output of the photo-detector will be a sine wave of much lower frequency compared with the monochromatic emission line of the source but constant peak-to-peak amplitude. If it is assumed that the wavelength of the optical input to the detector is, say, 2.5 micrometers and the predetermined limit of the optical path difference is 2 cm then clearly the number of recurrent cycles in the detector output must be 2 cm/0.00025 cm = 8000. If the time taken to move the mirror between zero optical path difference and the limit is 1 second, then the frequency of the detector output signal is 8000 Hz. In other words, the original optical wave has been modulated at a frequency of 8000 Hz, well within the audio range. The modulation sine wave, which may be displayed on a CRT, represents the interferogram of the source. If the Fourier Transform of the interferogram is computed, the resulting trace, in the form of a very narrow band, represents the emission line spectrum of the source.

If a broad-band source, e.g. an infrared source, is substituted for the monochromatic source, the output of the detector when the scanning mirror is in motion will no longer be a pure sine wave since the emission spectrum of the source will include waves of different frequencies. Each of the optical sine waves will give rise to two constituent beams and one resultant beam in the manner described earlier and all the resultant beams of different frequencies will be represented in the instantaneous output of the detector, each by its own modulation sine wave of related frequency and amplitude. If the output of the detector is plotted as before, the trace that results represents the emission interferogram of the source.

Now, if a sample not opaque to infrared is placed at the Jacquinot stop, the waves of different frequencies present in the emission spectrum of the source are attenuated to a different extent in a manner that is characteristic of the chemical nature of the sample and the resulting interferogram represents the infrared absorption interferogram of the sample superimposed on the emission interferogram of the source.

By taking the Fourier Transforms of the two interferograms, thus obtaining independently the spectrum of the sample-cum-source and that of the source alone, and then ratioing the first spectrum by the second, the spectrum of the sample is derived. In general the interferogram will consist of a dominant centreband flanked by intermingled waves decrementing more or less symmetrically in amplitude to vanishing values. It is worth observing that there is no point of communality between the various sine waves other than at the position of the scanning mirror corresponding to zero O.P.D. where all waves will undergo constructive interference; and that, of course, is the reason for the presence of the dominant centreband.

It can now be readily appreciated that, whatever the application of the Michelson-type interferometer which necessitates the optical path difference between the two interferometric arms to be changed, a very serious mechanical problem arises.

If mechanical imperfections in the guideways cause the moving mirror to tilt during the scan motion, the effective optical path difference may not be the same for each of several parts of the beam traversing different regions of the beam splitter, with the result that for a given wavelength some parts may be undergoing constructive and some destructive interference. In consequence, the amplitude of the detector signal is spuriously changed compared with the situation where no tilt is present. Servo controls in the form of tilt compensators have been developed but they account for a major portion of the complexity and cost of the entire instrument and can easily get out of adjustment. This is not surprising when it is realized that in a translating-mirror Michelson interferometer the tilt tolerance is typically one or two arc-seconds!

The problem is particularly severe in FT spectrophotometers where a scanning assembly reciprocating along a path of the order of centimeters must be provided. In many experimental and commercial instruments, a rectilinear reciprocating motion is chosen and a great deal of ingenuity has gone into devising means for guiding the assembly so as to confine its motion to a strictly rectilinear path. Linear air bearings and servo controls have been adopted in sophisticated and, therefore, expensive systems.

A practical proposal for a simple rotary scanning assembly which circumvents the major difficulties encountered with rectilinear scanning assemblies and is inherently tilt-compensated to some extent was described by R. S. Sternberg and J. F. James, of the Physical Laboratories of Manchester University, England, in the Journal of Scientific Instruments, Vol. 41, pages 225–226, April 1964, under the title "A new type of Michelson interference spectrometer". In the introduction to their article, the authors stress the drawbacks of scanning arrangements known at the time before discussing their solution. Unfortunately, although their proposal represents an interesting and valuable approach to the problem of lessening mechanical accuracy requirements, it has not been adopted by manufacturers of FT spectrophotometers, probably because it suffers from a serious drawback, now totally eliminated by the present invention.

In modern FT spectrophotometers, the analogue signal generated by the detector is digitized and processed by a microprocessor. It is an important requirement to ensure that the path of the beam reaching the detector does not change with the angular position of the scanning assembly or the optical throughput to the detector will change in a manner which is in no way related to the analysis of the spectrophotometric sample and does in fact vitiate analytical results. It will later be shown with the aid of a drawing, before the disclosure of practical embodiments of the present invention, that such requirement is not met by the prior art proposal, in which the optical output from the scanning assembly suffers a translatory displacement, with the result that, starting from a position of the scanning assembly correspondingly to which the entry pupil of optical converging means before the detector is totally filled, more and more of the rays will miss the pupil altogether as scanning progresses from that position in either rotational direction. The drawback is of course tolerable where the analogue changes in the signal need not be measured accurately, such as when the detector output is merely used for the purpose of counting interference fringes, but is certainly unacceptable in an FT spectrophotometer wherein the spectrum of the sample must be drawn with band amplitude fidelity of a high order.

SUMMARY OF THE INVENTION

The object of the present invention is to provide interferometric apparatus including a rotary scanning assembly for varying the optical path difference between two optical paths and producing an output beam, including contributions from the two paths, which is maintained on a substantially constant path for any angle of the scanning assembly within a design range and in addition to provide an improved Michelson-type interferometer, in particular an FT spectrophotometer, incorporating said scanning assembly.

In broad terms, the above object is achieved by providing the rotary scanning assembly with an output mirror the orientation of which in conjunction with the selection of the rotational axis of the assembly enables the function referred to above to be fulfilled.

In accordance with one aspect of the present invention there is provided an interferometric apparatus comprising a rotary O.P.D. scanning assembly mounting a mirror pair formed by a beam splitter and a folding mirror, said beam splitter having a semi-reflective beam-splitting layer one face of which is the optical input surface in accurately parallel face-to-face relationship with said folding mirror and the other the output surface. Two stationary reversing mirrors co-operate with said mirror pair for (a) defining two interferometric arms, each arm receiving one of the two beams resulting from the splitting of an input beam by the beam splitter, (b) rotationally scanning successive O.P.D. values between the two beams up to a predetermined maximum, and (c) recombining the beams at said output surface so that they emerge therefrom as a single beam directed along an output path. An output mirror is provided which is mounted at right angles to the output surface of said beamsplitting layer, said output mirror being borne by the scanning assembly and positioned to receive the output beam. Suitably arranged pivotal means ensure that the scanning assembly rotates around an axis substantially coincident with the line of intersection of the prolongation planes of the semi-reflective beam-splitting layer and the face of the output mirror, respectively.

In the interferometric apparatus as defined, the specified geometric relation between the semi-reflective layer and the output mirror in conjunction with the positioning of the rotational axis of the scanning assembly enable the output beam to be directed along an output path that is substantially immutable in space for any scan angle within the design range of the assembly.

Because the output beam may be utilized in conjunction with a photosensitive device of very small active area, it may be essential for it to have particularly high spatial constancy. The T.G.S. (triglycine sulphate) detector of infra-red radiation, which is now often chosen by designers because of its high sensitivity and comparatively fast response, is such a device. With an active circular surface area only one or two millimeters in diameter, it clearly cannot tolerate any significant lateral displacement of the beam impinging thereon, even accounting for the fact that in certain applications the problem is lessened by the active area receiving in fact a demagnified stop image, e.g. demagnified Jacquinot stop image in the case of FT-IR spectrophotometers. (IR stands for Infrared).

The outstanding advantage of the part played by said specified geometric relation within the overall co-operation of the optical elements defined is that it has made the adoption of the rotary O.P.D. scanner a real feasibility in all those applications where the spatial inconstancy of the output beam associated with the prior art rotary scanner had hitherto prevented it—first and foremost in FT-spectrophotometry.

A consequence of the specified geometric relation referred to is that the beam splitter is not rotated around an axis of symmetry. This means that the cross-section of the input beam must translate across the face of the beam splitter as the scanning assembly is rotated. But even if the rotational axis were an axis of symmetry co-planar with the semi-reflective layer, the projected area of the input beam cross-section onto the beam splitter would still vary with the angle of rotation of the scanning assembly.

In accordance with another aspect of the present invention, the combined translation and projection effects may be taken into account by adopting a circular configuration for the effective area of the beam splitter and an elliptical one for the cross-section of the input beam, the major and minor axes of the ellipse being so chosen that the effective area of the beam splitter almost totally swept by the ellipse is substantially a minimum that will meet the desired optical throughput and the angular travel limits of the scanning assembly required to achieve the predetermined O.P.D. maximum value. This is tantamount to saying that the whole of the beam splitter area is utilized almost to the full.

Apart from the economical advantage enabled by the refinement, in so far as beam splitters are expensive optical elements, there is also a mechanical benefit in that the smaller beam splitter is more mechanically stable.

Although it is proposed that the rotational axis of the scanning assembly be substantially coincident with the line of intersection referred to earlier, in fact a slight departure from coincidence can be tolerated. Naturally, if coincidence is aimed at in the first place, a more symmetrical region of tolerance around the ideal axis is achieved. Because of that tolerance, the mounting of the scanning assembly is simplified. In fact, the scanning assembly may comprise an integral rotatable casting mounting the folding mirror, the beam splitter and the output mirror. It may be housed within a stationary integral casting mounting the reversing mirror, two simple pivotal connections between the two castings allowing the first to rotate relative to the second, without any need for sophisticated and, therefore, costly bearings.

An interferometric apparatus in accordance with the present invention offers particular advantages when the apparatus is in fact an FT-spectrophotometer based on a Michelson-type interferometer, especially where a reference interferometer with a laser source is incorporated. In so far as the laser beam must be made to follow the same path through the scanning assembly as the spectrophotometric input beam, the reference interferometer will itself benefit from a spatially constant output beam which is of very small cross-section and must be critically aimed at co-operating photosensitive devices of small active areas, to obtain electrical signals therefrom through which the acquisition of data points from the interferogram of the sample under analysis may be accurately timed.

DETAILED DESCRIPTION OF THE INVENTION

Figure 1:
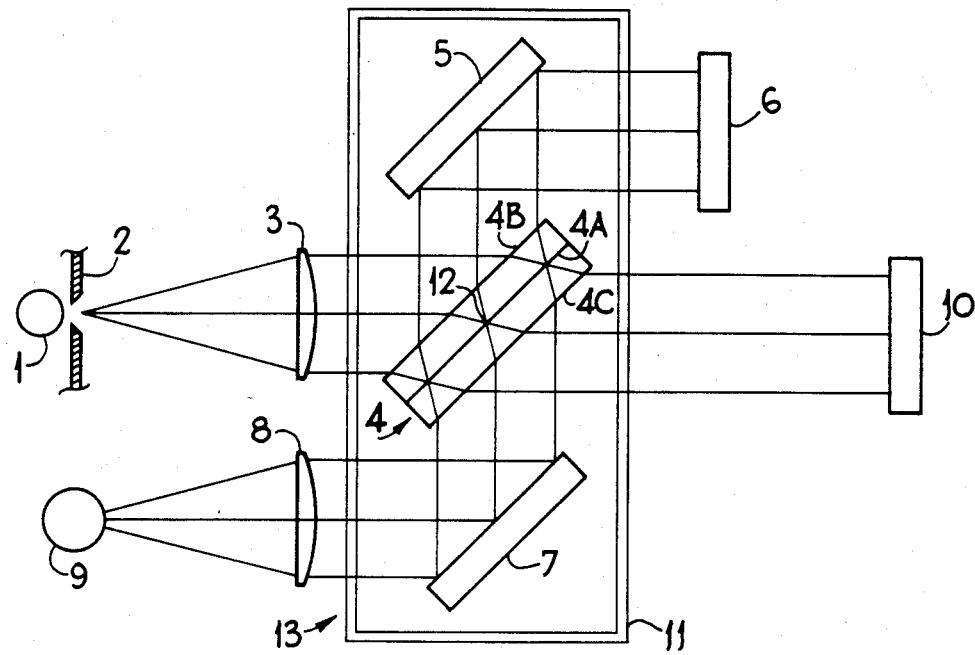
FIG. 1 depicts a Prior Art interference spectrometer of the Michelson type incorporating a rotary O.P.D. scanning assembly.

It is thought that the concept of the present invention, as well as one particular manner in which it may be put into effect, can best be appreciated by first describing, with the aid of FIG. 1, the prior art rotary scanning assembly referred to earlier, as part of a Michelson-type interferometer. An added advantage of this approach is the opportunity it offers to relate the foregoing generalities on the said type of interferometer to a basic diagrammatic representation.

In FIG. 1, light emitted by a source 1 stopped down by an aperture plate 2 is collimated by a positive lens 3 into an input bundle of nominally parallel rays directed towards a beam splitter 4 oriented at 45 degrees to the incoming rays and comprising a semireflective (i.e. partially reflecting and partially transmitting) layer 4A sandwiched between transparent supporting slabs 4B and 4C having identical optical characteristics. Upon striking the layer 4A, the input bundle is split into a reflected bundle portion, with a 90-degree bend, and a transmitted bundle portion.

The reflected bundle portion encounters a plane folding mirror 5 and a plane reversing mirror 6 in its travel along a forward path extending from the layer 4A to the mirror 6, before reversing into a return path that extends from the mirror 6 to the layer 4A and is spatially coincident with the forward path. At the end of its return path, it partially traverses the layer 4A, is deflected by a plain folding mirror 7 into the entry pupil of a positive lens 8, and is finally brought to a focus at a photodetector 9. The sum of the forward and reverse optical paths extending between the layer 4A and the reversing mirror 6 represents a first interferometric arm of the interferometer outlined in FIG. 1. We shall refer to this arm as the upper arm.

The transmitted bundle portion passes through the layer 4A at the start of its travel along a forward path, strikes the plane reversing mirror 10 at the end of that path, bounces back along a return path that terminates at the layer 4A and is spatially coincident with the forward path, is reflected by the layer 4A, and, again, by the plane mirror 7, into the entry pupil of the positive lens 8, and is finally brought to a focus at the photodetector 9. The sum of the forward and return optical paths extending between the layer 4A and the reversing mirror 10 represents a second interferometric arm. We shall refer to this arm as the lower arm.

Since the optical path extending between the layer 4A and the photodetector 9 is shared by the two bundle portions reaching the photodetector 9 from the two arms of the interferometer, respectively, and neither bundle portion can therefore suffer retardation with respect to the other, as long as the optical path lengths of the two interferometric arms are absolutely identical, a wavefront reaching the layer 4A along the return path of the first interferometric arm is coincident in space with a wavefront reaching the layer 4A along the return path of the second interferometric arm, with the result that the two wavefronts are recombined at the layer 4A (constructive interference). If the beam splitter 4 were perfect, and no transmission losses were suffered by the rays, the recombined bundle of rays would have exactly the same intensity as the input bundle issuing from the lens 3. Under such ideal conditions, if one were to replace the detector 9 with a diffusing screen and the source 1 emitted visible light (say, monochromatic light, to take the simplest case), one would observe a patch of light on the screen that could not be distinguished in intensity from the patch that would be seen if the screen were placed at the aperture of aperture plate 2.

On the other hand, if the optical path length of one interferometric arm was greater than that of the other arm, the optical path difference thus established would cause the wavefronts of the light from the arm having the greater optical path length to be retarded relatively to the wavefronts from the other arm. With the wavefronts out of phase, the light patch observed on the screen at the detector location would be less intense than before by an amount related to the out of phase angle, and, in the extreme case (phase opposition), would not be visible at all (destructive interference).

In the prior art arrangement being reviewed with reference to FIG. 1, the optical length of the lower interferometric arm is fixed and that of the upper arm is variable, which is tantamount to saying that the O.P.D. between the two arms may be varied (or modulated). To this end the beam splitter 4 and the mirrors 5 and 7 are rigidly mounted in a frame 11 rotatable around a pivot 12, normal to the plane of the paper, and affixed to a stationary base plate (not shown) to which the remainder of the components shown in FIG. 1 are firmly attached. The frame 11 and the parts represented within it constitute an O.P.D. scanning assembly, which will henceforth be referred to more briefly as scanner 13. As shown in FIG. 1, the scanner 13 is in the attitude that gives exactly zero optical path difference between the two interferometric arms.

The prior art interferometer of FIG. 1 is said to be aligned (i.e. the wavefronts from the two arms recombine exactly at the beam splitter layer 4A when the O.P.D. is zero) if:

(a) the mirror 5 is mounted accurately parallel to the beam splitter 4;

(b) the lower-arm reversing mirror 10 is set up to image the aperture in aperture plate 2 onto itself;

(c) the upper-arm reversing mirror 6 is set up so that its image via mirror 5 and beam splitter 4 is parallel to the mirror 10; and (d) the mirror 7 is parallel to the beam splitter 4 to within one degree or so.

It is to be assumed that the interferometer shown has been properly aligned in accordance with the above procedure.

To change the O.P.D. between the two interferometric arms, it is merely a question of rotating the scanner 13, say, anti-clockwise around the pivot 12. When that is done, the optical path length of the lower arm remains unchanged but that of the upper arm increases. No motion of the scanner 13 other than the rotation—in either sense of direction—around pivot 12 can affect the O.P.D. This is essentially due to the well known properties of a pivotally mounted pair of accurately parallel plane reflectors, such as in fact represented by the layer 4A and the mirror 5. Such pair will ensure that, although the optical path of the upper arm is increased by the anti-clockwise rotation of the scanner 13, the bundle of rays reaching the mirror 6 are not tilted in the process but simply translate a little lower down the mirror 6. This result is achieved whether the pivot 12 is located as shown or anywhere else. What happens to the optical path length of the common path extending between layer 4A and lens 8 is not important, of course, since there cannot be any O.P.D. between two common optical paths.

Unfortunately, a serious disadvantage of the scanner 13 is that not only the horizontal bundle of rays in the upper arm translate over the face of the mirror 6 but also the parallel rays directed to the lens 8 translate over the face of mirror 7. Thus, as the scanner 13 is turned anti-clockwise, at the same time that the bundle of rays directed to mirror 6 sweeps downwards, the recombined bundle from mirror 7 sweeps upwards, with the result that its effective cross-section is increasingly reduced since it no longer fills the aperture of the lens 8, as in FIG. 1, but increasingly underfills it from the bottom up. It follows that the solid angle of light energy reaching the detector 9 is correspondingly decreased or, more generically, the path of the impinging rays is changing with the position of the scanner 13.

That the rays emerging from the scanner 13 move parallel to themselves as the said scanner is rotated can be readily appreciated by observing that while the direction of the collimated bundle of rays emerging from the lens 3 is immutable that of the corresponding rays reflected by the layer 4A changes with the angle of rotation of the scanner 13. For anti-clockwise rotation from the attitude depicted in FIG. 1, the reflected rays impinge on the mirror 5 at a smaller angle of incidence (i.e. the angle between an incident ray and the normal to mirror 5) than before and, therefore, lower down the mirror face. It follows that any ray reflected by mirror 5 will also meet mirror 6 lower down the face. Since any one ray reaching the mirror 7 is the optical prolongation of a ray that impinged on mirror 5 and was returned to mirror 5 via reversing mirror 6, it follows that said ray, say, the central ray in FIG. 1, will impinge on mirror 7 higher up than shown, i.e. will translate upwards.

Where the instantaneous intensity of the light reaching the detector within an area imaging the aperture stop of the interferometric system must be measured, as is the case in commercial FT optical spectrometers, the path of the rays impinging on the detector must remain constant as the O.P.D. is scanned. The prior art O.P.D. scanner shown in FIG. 1 would not, therefore, be suitable for such application.

The arrangement of FIG. 1 has been modified to produce an embodiment in accordance with the present invention whereby the output beam reaches the detector along an optical path that remains fixed in space throughout the scanned O.P.D. range, thus opening up a vast field of application for a rotary O.P.D. scanner, the considerable virtues of which—first and foremost the comparative ease with which mechanical precision of scanning can be achieved—could not be exploited hitherto owing to the scanning action giving rise to a translation of the beam emerging from the scanner.

Figure 2:
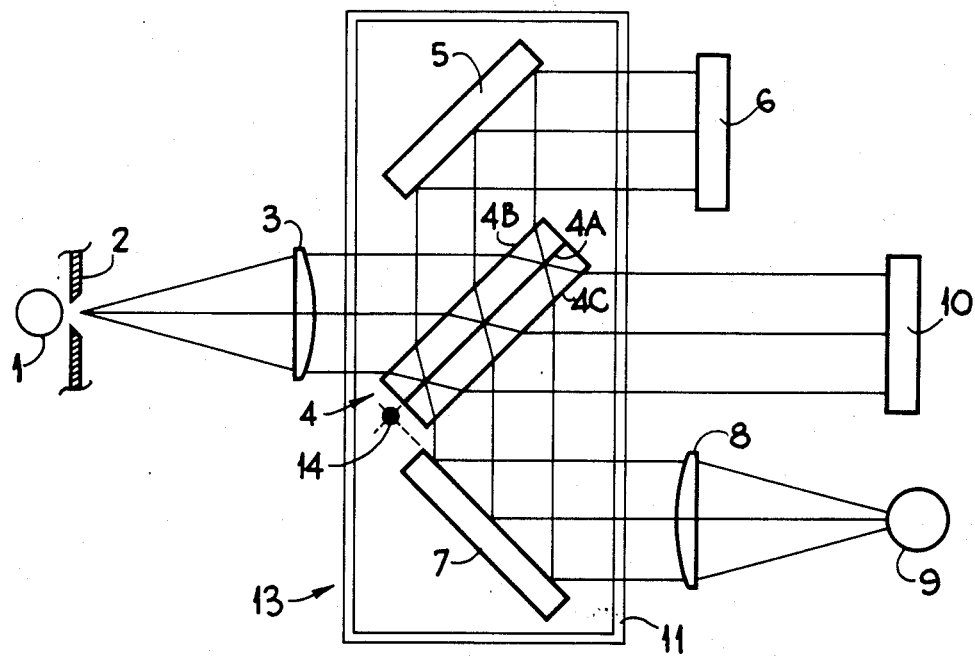
FIG. 2 represents the interference spectrometer of FIG. 1 modified to incorporate a rotary O.P.D. scanning assembly in accordance with the present invention.

In FIG. 2, depicting the modified arrangement, the mirror 7 has been turned around so that it lies with its reflecting face normal to the layer 4A. It follows that lens 8 and detector 9 are transferred to respective positions symmetrical with those occupied in FIG. 1.

The pivoting point for the O.P.D. scanner is no longer at 12 but has been shifted to 14, the actual axis of rotation being at the line of intersection between the prolongation of layer 4A and that of the reflecting surface of mirror 7, the prolongations being indicated by the intersecting dotted lines shown.

Figure 3:
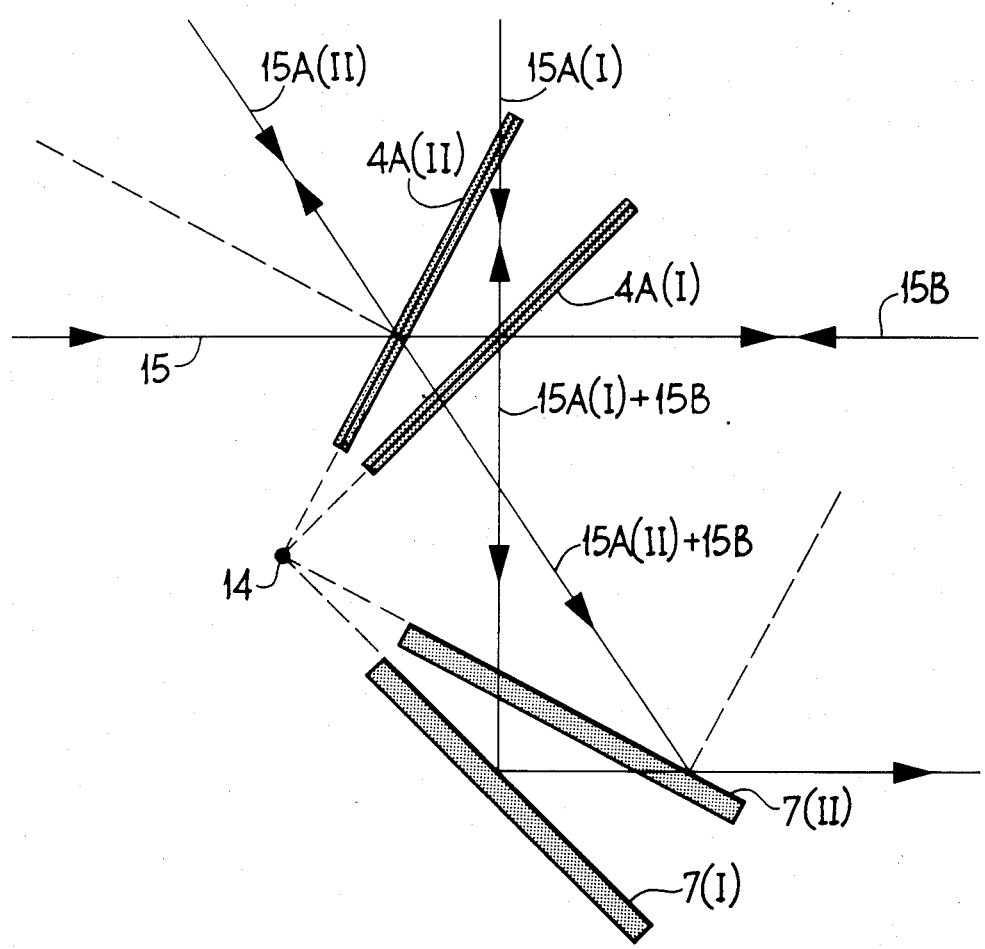
FIG. 3 is a diagram intended to illustrate that the path of the output rays of the rotary O.P.D. scanning assembly in accordance with the present invention remains substantially fixed in space for any angle of rotation of the assembly within its design range.

The result of the changes thus introduced is quite dramatic. As observed earlier, the location of the axis of rotation in no way affects the operation of the mirror pair represented by layer 4A and mirror 5 in ensuring that for any angle of rotation of the scanner 13 the bundle of rays directed towards and returning from mirror 6 remain strictly perpendicular to the reflecting face of mirror 6. It follows that in explaining the operation of the present embodiment it will be sufficient to consider the effect of re-orientating the mirror 7 and selecting the rotary axis 14 on rays emerging from the scanner 13 after passing through layer 4A from the upper interferometer arm, combining with rays from the lower arm and bouncing off the mirror 7. It will naturally be assumed that the modified interferometer has been aligned in accordance with the procedure described earlier for the FIG. 1 interferometer. In FIG. 3, with some reference to FIG. 2, the effect is illustrated in diagrammatic form by following the path of a single input ray 15, from the point of emergence from lens 3 (FIG. 2) up to the scanner output, for two arbitrarily chosen angular positions of the scanner 13: an initial position for which the angle of incidence of ray 15 on layer 4A is 45 degrees, and a final position for which the angle of incidence is reduced to 28 degrees. The Roman numeral I added in brackets to the references 4A and 7 denote the initial position; and the Roman numeral II similarly added to the said references, the final position. The rays associated with the initial and final positions, respectively, are similarly distinguished. In the interest of simplicity, the split rays associated with the two interferometric arms have been truncated so that only the portions that co-operate with the beam splitting layer in each of the two positions of the scanner are shown in FIG. 3.

With the scanner 13 in the initial position as indicated, the input ray 15 meets the layer 4A(I) and after being split in rays 15A(I) and 15B, in the manner generally described earlier with reference to FIG. 1, is recombined as 15A(I)+15B, ray 15A(I) being returned by reversing mirror 6 via mirror 5 from the upper interferometric arm and ray 15B by the reversing mirror 10 from the lower arm.

Clearly ray 15 and its recombination 15A(I)+15B must be normal to each other since the latter is on the prolongation of 15A(I) which is normal to 15 because it originates from a 90-degree partial reflection of ray 15 by layer 4A. Mirror 7(I) is normal to layer 4A(I) and it follows that ray 15A(I)+15B must meet it at 45 degrees with the result that ray 15A(I)+15B is reflected at 90 degrees and exits parallel to the input ray 15.

It will now be shown that in the final position of the scanner 13 the ray that is to be referenced 15A(II)+15B will not only exit parallel with the ray 15 (which is also achieved by the prior art interferometer shown in FIG. 1) but it will actually lie on a path coincident with the path on which ray 15A(I)+15B exits when the scanner 13 is in the initial position (which is not achieved by the FIG. 1 interferometer). In other words, it will be shown that in moving the scanner 13 from one to other position the exit ray stays on the same path.

With the scanner 13 in the final position, the input ray 15 meets the layer 4A(II) at an angle of 28 degrees, as stated earlier, and a split portion 15A(II) is deflected at twice that angle into the upper interferometric arm. The returning 15A(II) ray recombines with the 15B ray to form the 15A(II)+15B ray which intersects the mirror 7(II) at a point where the path of the ouput ray for the scanner 13 in the initial position also intercepts the mirror 7(II). If the normal to the mirror 7(II) at the point of intersection bisects the angle by which the recombined ray has been deflected, then the output ray for both initial and final positions of the scanner 13 must lie on a common path. That is in fact the case, as can be easily verified for any angle of rotation of the scanner 13 within its design range. This means that the present embodiment ensures that the exit path of the ray 15 (and of course any other ray one wishes to consider) remains fixed in space, thus completely eliminating in a very simple manner the very serious drawback of the prior art proposal.

Figure 4:
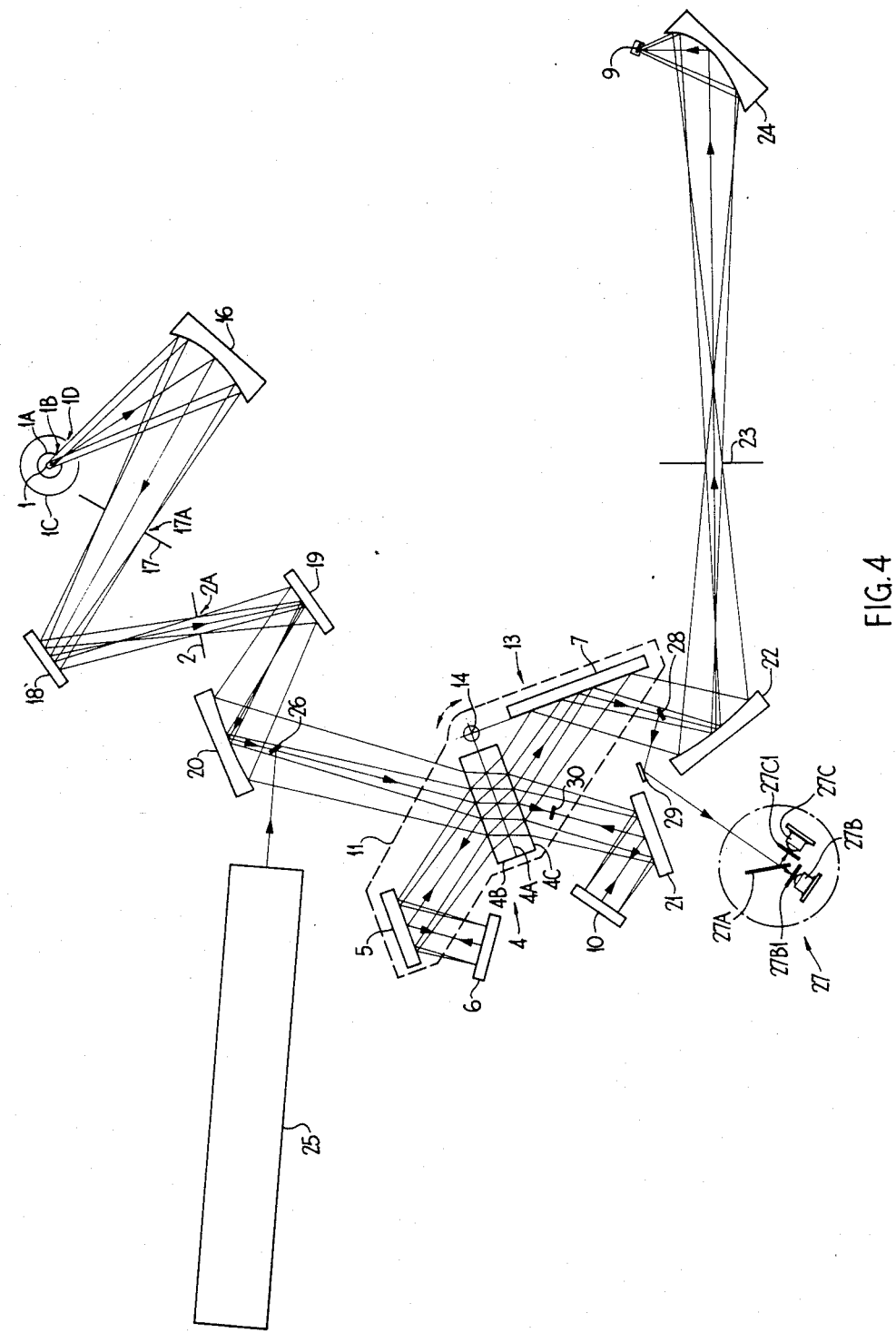
FIG. 4 is a symbolic layout of an FT-IR spectrophotometer incorporating a rotary O.P.D. scanning assembly in accordance with the present invention.

An FT-IR spectrophotometer embodying an O.P.D. scanner in accordance with the present invention and suitable for operation in the region of the infrared spectrum extending between 4000 cm$^{-1}$ and 400 cm$^{-1}$, equivalent to wavelengths of 2.5 and 25 microns, respectively, is diagrammatically represented in FIG. 4.

In FIG. 4, a coiled platinum-wire IR source 1, longitudinally extending along an axis normal to the plane of the paper, is surrounded by a cylindrical shield 1A having a window 1B facing the median hottest zone of the source. The shield 1A is represented to suggest that a cross-section has been taken on a plane intersecting the said axis and bisecting the window 1B. The whole is surrounded by a further shield 1C with a circular window 1D much larger than widow 1B and similarly represented. The patch of the infrared radiation emitted by the source 1 through window 1B that is actually utilized in the spectrophotometer is not determined by either window 1B or window 1D but by the post-source optics, as will be presently shown. A principal ray and two pairs of marginal rays, one pair from each lateral end of the utilizated patch are traced through the entire system.

The infrared rays as defined impinge upon an elliptical mirror 16, one focal region of which coincides with the radiation patch at the source 1, and the other with circular aperture 2A in plate 2, of such diameter that the said aperture is overfilled all round by the image of said patch. A baffle plate 17 located at a pupil position positively defines the effective aperture of the mirror 16 by virtue of an aperture 17A shaped in the form of an ellipse having major and minor axes predetermined for a purpose to be presently described, and a plane mirror 18 folds the rays emerging from the aperture 17A onto the aperture 2A. The arrangement so far described serves to image the radiation patch from the source 1 at the aperture 2A, with the result that the radiation-filled circular aperture 2A becomes the effective source with a well defined imagery and being overfilled effectively determines the area of the radiation patch actually utilized. In sum, it represents the aperture stop (or Jacquinot stop) of the system.

A second plane mirror 19 folds the beam emerging from aperture 2A onto parabolic mirror 20, the length of the optical path between the latter two elements being approximately equal to the focal distance of the mirror 20, which acts therefore as a collimator and may be regarded as the optical counterpart of the lens 3 in FIGS. 1 and 2. Since the source 1 is not a spot source but is intended to be a finite area source, collimation is approximate but adequate nevertheless.

In addition, mirror 20 images the elliptical aperture 17A onto the reversing mirrors 6 and 10. The major and minor axes of the elliptical patch of radiation projected have been chosen to ensure efficient utilization of the circular active area of the beam splitter for a given optical throughput and O.P.D. scan range, bearing in mind that in the present embodiment the collimated beam actually translates over the beam splitter surface, as reference to FIG. 3 will show. Further elaboration of this feature, which is believed to be novel per se, will be given after the description of FIG. 5.

The collimated beam produced by the parabolic mirror 20 forms the optical input to the interferometric optics proper, wherein the semi-reflecting layer 4A of beam splitter 4 forming part of the O.P.D. scanner 13, within the boundary of frame 11 shown in dashed lines, co-operates through its upper folding mirror 5 with the fixed reversing mirror 6 to define the upper interferometric arm and, through the lower folding mirror 21, with the reversing mirror 10 to define the lower interferometric arm. Note that the mirror 21 enables optical symmetry to be established between the two interferometric arms.

The beam recombined at the beam splitter 4 in the manner described earlier exits from the scanner 13 via the outut mirror 7, which performs the all-important function already explained with reference to FIGS. 2 and 3. A parabolic mirror 22 converges the output beam from the scanner 13 onto its focal region, whereat an image of the Jacquinot stop is projected and a thinly layered analytical sample borne upon a carrier 23 is to be located. An elliptical mirror 24 is so designed and positioned that said image spatially coincides with its first focal region and is relayed with a de-magnification of approximately 6:1 to its second focal region, which is occupied by the sensitive surface of detector 9.

Note that the analytical sample and its carrier may assume any of the convenient forms well-known in the art. A thinly-layered sample has been indicated because it is a commonly used form and may be readily related to the nominal plane of the Jacquinot stop image.

Figure 5:
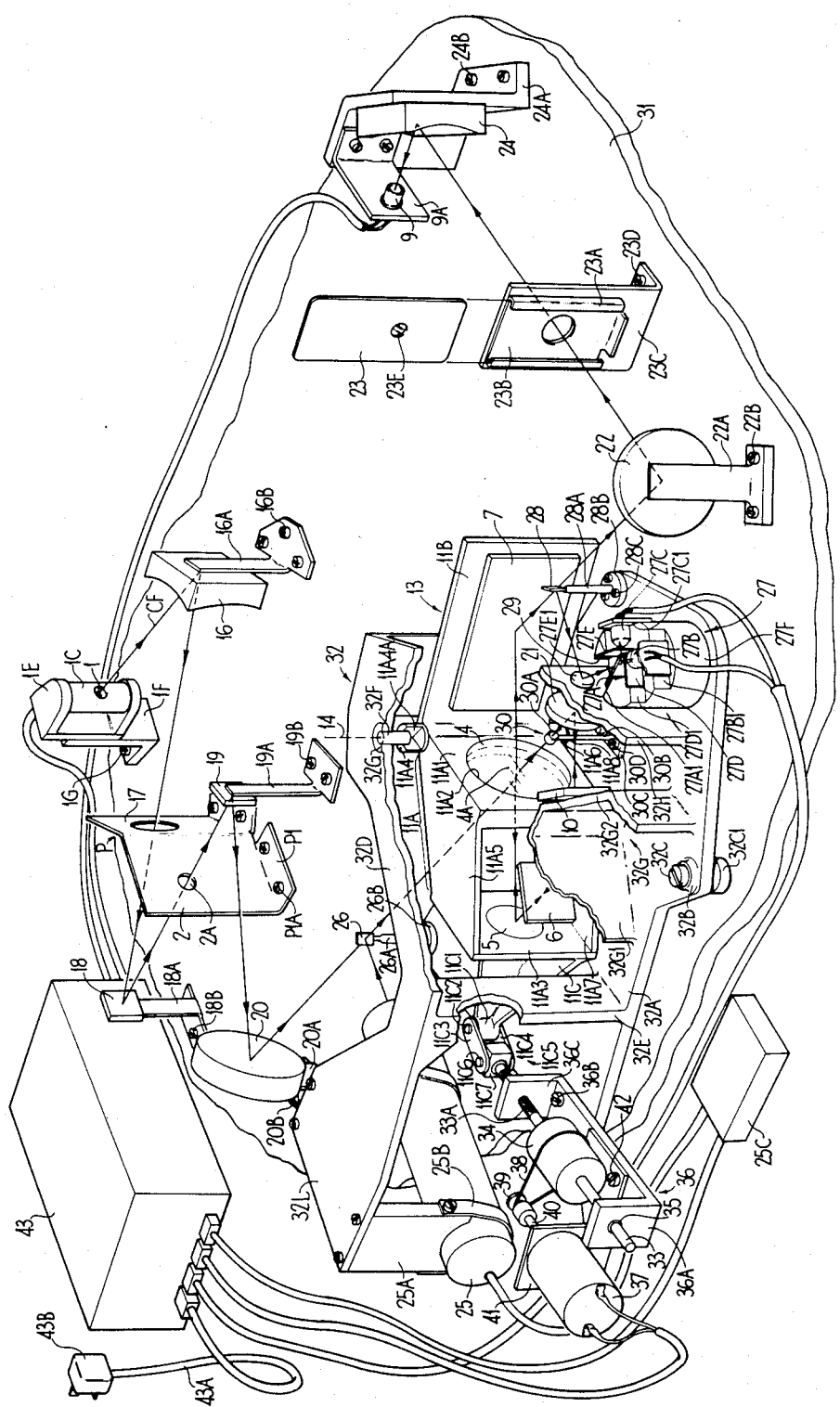
FIG. 5 is a practical layout corresponding to the symbolic layout of FIG. 4.

All the components shown in FIG. 4, with the exception of those within frame 11 forming part of scanner 13, are rigidly mounted on a base plate, not shown in FIG. 4 but represented in the constructional drawing of FIG. 5. Scanner 13 is rotatable to and fro between two limit positions around axis 14 within a housing itself fixed to the base plate, as will be described with reference to FIG. 5.

As shown in FIG. 4, the scanner 13 is midway between its limit positions and provides zero O.P.D. between the two interferometric arms. The two limits, attained by clockwise and anti-clockwise rotation, respectively, correspond to O.P.D. values that are equal but of opposite sign. In fact, clockwise rotation of the scanner from the position shown increases the optical path length of the variable interferometric arm and anti-clockwise rotation decreases it. It is therefore convenient to refer to the clockwise O.P.D. limit as $L_{max+}$ and the anti-clockwise as $L_{max-}$. By swinging the scanner 13 from one to other limit, a complete double-sided interferogram is generated, as required for the purpose of computing its Fourier Transform. In the present embodiment, $L_{max}$ is 2 cm and the scan time between $L_{max}$ and zero O.P.D. is 1 second.

For a purpose that presently will be referred to in some detail, a reference monochromatic interferometer is inserted in the optics of the main interferometer, forming part of the FT-IR spectrophotometer described, so that they share the scanner 13. The reference interferometer comprises, in addition to the shared scanner 13, a low-power laser 25 providing a line of monochromatic plane-polarized radiation at a wavelength of 632.814 nanometers. The plane-polarized beam issuing from the laser 25 is passed through the scanner 13 via a small plane mirror 26 located in the collimated beam produced by parabolic mirror 20 and is recovered from the collimated beam at the output of scanner 13 for directing to sensor unit 27 via plane mirror 28 co-operating with mirror 29. In passing through the scanner 13, the beam traverses a ⅛-wave plate 30 and is affectd thereby in a manner that will be presently indicated. At the sensor unit 27, a beam splitter 27A permits a transmitted part of the laser beam to reach a photosensor 27B without a change in direction and a reflected part to reach a photosensor 27C with a 90-degree deflection, the axis of the two sensors being spaced 90 degrees apart. For a purpose to be considered later, plane polarizers 27B1 and 27C1 are positioned before photosensors 27B and 27C, respectively, with their transmission planes crossed.

In FIG. 5 the diagrammatic representation of FIG. 4 has been translated into an engineering layout of real components, with only the chief ray CF shown to trace the optical path from the source 1 to the detector 9. It is believed that FIGS. 4 and 5 together facilitate a proper appreciation of function and construction in the realization of an O.P.D. scanner per se and as part of an FT-IR spectrophotometer, both in accordance with the present invention. Incidentally, although the mechanical precision requirements are made less stringent by confining operation to the infrared region of the electromagnetic spectrum, the rotary O.P.D. scanner in accordance with the present invention enables high precision to be advantageously attained in regions of the spectrum of shorter wavelengths.

In the description that follows, references identifying elements shown diagrammatically in FIG. 4 will also identify the corresponding real components in FIG. 5. Of these, the mirrors 16, 18, 19, 20, 22 and 24 need no further elaboration except for pointing out that they are supported on brackets 16A, 18A, 19A, 20A, 22A and 24A, respectively, for fixing by means of screws 16B, 18B, 19B, 20B, 22B and 24B to a rigid base plate 31, as shown. It will be noted, in addition, that the detector 9 is mounted on an L-shaped bracket 9A which is itself attached to an extension of bracket 24A mounting mirror 24, and that the sample carrier plate 23 is slid, in use, into channels 23A formed in a guide plate 23B fixed to a bracket 23C for mounting on the base plate 31 by means of screws 23D, the sample having been made fast to the carrier 23 over the circular aperture 23E by any suitable means well known in the spectroscopic art. Furthermore, the baffle 17 and the Jacquinot stop 2 form a combined unit P made of sheet metal in which the aperture of the former is oval and that of the latter circular. A bottom flange P1 enables the unit P to be screwed to the base plate 31 by screws P1A.

The source 1, complete with its outer shield 1C, is mounted vertically between the limbs of a U-shaped bracket 1E that is itself attached to the upright limb of an L-shaped bracket 1F in turn affixed, through the other limb of the L, to the base plate 31 by screws such as 1G.

Attention is now particularly directed to the bottom left-hand corner of FIG. 5, whereat two castings are shown, one comprising three integral sections 11A, 11B, 11C forming one part of the O.P.D. scanner 13 and the other, referenced 32, providing essentially a housing within which the scanner 13 is rotatably mounted in a manner to be described.

Casting 11A-11B-11C, which may be regarded as an engineered version of the frame 11 diagrammatically shown in FIG. 2, comprises a box-like centre section 11A extending, to the right, into a flag 11B and, to the left, into a drive arm 11C. The centre section 11A has a wall 11A1 provided with an aperture 11A2 into which a beam splitter 4 of circular configuration is fixedly mounted and a facing wall 11A3 mounting folding mirror 5, which is also circular.

As shown in FIG. 5, the beam splitter 4 is of the same construction as the beam splitter 4 in FIG. 4, in that it comprises a semi-reflective layer sandwiched between two supporting slabs transparent to the radiation emanating from the source 1 and having identical optical characteristics. However, the semi-reflective layer 4A (FIG. 4) may alternatively be provided on a taut film transparent to said radiation. It may also take the form of a specular foraminous structure such as a mesh or a grid, in which case the layer represented by the structure is semi-reflective by virtue of the lack of reflection from the open spaces in said structure. The structure may be self-supporting or carried on a transparent taut film. In the latter case, it could be provided as a layer vacuum evaporated onto the film.

Figure 8A:
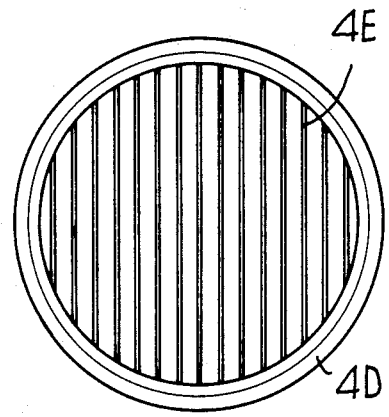
FIGS. 8A to 8D depict alternative beam splitter constructions suitable for use in the present invention.
Figure 8B:
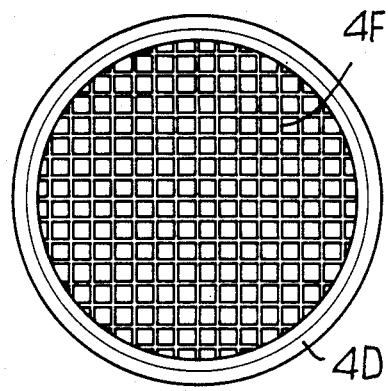
Figure 8C:
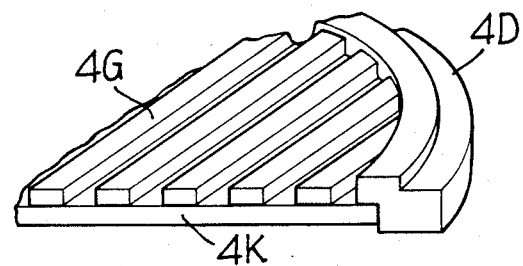
Figure 8D:
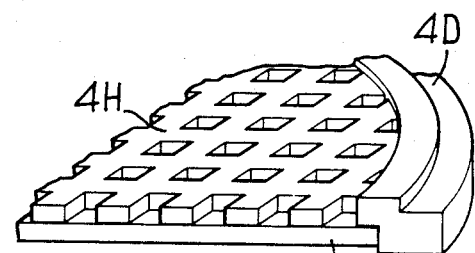

Alternative beam splitter constructions as referred to are depicted in FIGS. 8A to 8D. In each figure, a ring frame 4D forms a carrier for a semi-reflective layer. In FIG. 8A, the frame 4D supportes closely spaced, stretched, parallel wires forming a grid 4E; in FIG. 8B, the two sets of parallel wires intersect to define a mesh 4F. FIGS. 8C and 8D, which are cross-sections of perspective views along a diameter of the frame 4D, depict a grid 4G and a mesh 4H, respectively, as vacuum deposited layers on a transparent film 4K stretched over the frame 4D.

The flag 11B acts as a carrier for rectangular mirror 7, which is rigidly supported normal to the beam splitter 4. The region where the flag 11B extends from the centre section 11A includes the line of intersection between the surface prolongations of mirror 7 and reflecting layer 4A of beam splitter 4. An upper boss 11A4 is formed in an upper wall 11A5 of section 11A, roughly concentric with the said line of intersection. Within the boss 11A4 a V-shaped bearing 11A4A is provided. Similarly, a lower boss 11A6 is provided in a lower wall 11A7 of section 11A which is roughly concentric with the line of intersection. Within the boss 11A6 a ball bearing 11A8 is fixedly mounted.

The drive arm 11C has an end boss 11C1 acting as a bearing to a pin 11C2 connecting one end of a plate 11C3 to one end of a plate 11C4, the two plates forming a linkage 11C5 which further comprises another pin 11C6 joining the remaining two ends of the plates and rotatable in a block 11C7. The housing 32 comprises a floor 32A, having holed bosses such as 32B through which screws such as 32C are passed for fixing the housing 32 to the base plate 31 through resilient mountings such as 32C1, and a roof 32D spacedly supported by intervening vertical members such as integral pillar 32E. A cylindrical pivot 32F that is a forced fit in boss 32G is provided for engaging the V-shaped bearing 11A4A in boss 11A4. A recess (not shown) in the floor 32A houses a spherical bearing member (not shown) for engaging the ball bearing 11A8 in boss 11A6. The axis of rotational symmetry of the pivot 32F and that of said spherical bearing member coincide with the line of intersection referred to earlier and the ball bearing 11A8 is mounted so that a diameter thereof also coincides with said line. It follows that the arrangement described pivotally mounts the scanner 13 in the housing 32 for rotation around an axis which coincides with said line of intersection, i.e. axis 14. Moreover, the location of the axis creates a weight offset towards the front in the scanner 13 as seen in FIG. 5, with the result that the V-shaped bearing 11A4A is urged by gravity into contact with the pivot 32F.

One of the vertical spacing members between the roof 32D and the floor 32A is mirror carrying structure 32G provided with vertical walls 32G1 and 32G2, supporting mirrors 6 and 10, respectively, the said walls being oriented so as to locate the mirrors in the correct angular positions diagrammatically illustrated in FIG. 4. A further member 32H in the form of a pillar of rectangular cross-section is used to mount the mirror 21.

The drive means for rotating the scanner 13 to and fro within two predetermined angular limits relative to the housing 32 will now be described. One end of a drive shaft 33 solidal with a cylindrical drive roller 34 is free to rotate in block 11C7 but is longitudinally captive thereto. The shaft 33 is further pivotally supported at its other end in a plain sleeve bearing 35 mounted in one limb 36A of a U-shaped bracket 36 fixed to the floor 32A by screws such as 36B, said sleeve bearing 35 additionally allowing freedom of axial displacement. The drive shaft 33 includes an integrally formed lead screw portion 33A engaging a mating thread in the other arm 36C of bracket 36. The drive shaft 33 may be rotated in either direction by an electric motor 37 via a belt 38 forming a drive linkage between a pulley 39 mounted on motor shaft 40 and the cylinder 34. The motor 37 is mounted on a bracket 41 affixed to the U-bracket 36 by screws such as 42. Assuming that the lead screw 33A is righthanded, clock-wise rotation of the motor shaft 40 causes the drive shaft 33 to move forward, thus urging the scanner 13 to turn in a clock-wise direction, the gradually changing angle between the drive shaft 33 and the drive arm 11C in a plane parallel to the floor 32A and passing through the axis of shaft 33 being taken up without restraint by the action of the linkage 11C5. At the same time the belt 38 will not impose more than a negligible restraint on the longitudinal motion of the shaft 33 by virtue of the fact that the side thrust in its engagement with the cylinder 34 introduced by said motion will cause it to slip axially of the cylinder 34. The operation for anti-clockwise rotation of the shaft 33 is, of course, similar although the direction of the side thrust is reversed.

An overhanging portion 32L of the roof 32D supports the laser 25 through saddles, of which only saddle 25A is visible, co-operating with straps 25B. The mirror 26 is mounted on a stem 26A terminating in a circular foot 26B attached to the floor 32A by screws (not shown). The $\frac{1}{8}$-wave plate 30 is contained within a cylindrical housing 30A supported by a stem 30B terminating in a rectangular foot 30C screwed by screws 30D to the floor 32A. Mirror 28 is mounted in the same manner as mirror 26, stem 28A, foot 28B and fixing screws 28C being clearly visible. Mirror 29 is provided with a rear stem fitting in a hole drilled in the pillar 32H, the stem and the hole being hidden.

A cylindrical body 27F in unit 27 is provided with recesses in which suitably oriented machined faces 27A1, 27B1, 27C1, 27D1 and 27E1 adhesively support the already introduced elements 27A, 27B, 27C, 27D and 27E, respectively.

The electrical elements shown in FIG. 5 are inserted in an electrical operating system co-operating with the mechanical parts hereinbefore described. The laser 25 is energized through a modular power supply 25C, the latter being connected to a public-supply outlet via a power and instrument control pack 43 having a lead 43A terminating in a plug 43B for connection to said outlet. Leads from the detector 9, photosensors 27B and 27C and drive motor 37 also extend into pack 43, which includes, in addition to power supply circuitry, the whole of the hardware represented in the block diagram of FIG. 7, with the exception, of course, of a Video Display Unit and Keyboard that will be presently introduced and the blocks representing the detector 9, the motor 37 and the unit 27, of course.

A procedure is now described for defining the major and minor axes of the elliptical patch of radiation introduced earlier in this disclosure. In such procedure, the area of the patch is an immutable datum, fixed by the desired radiation throughput of the instrument.

A satisfactory approach is to estimate, in the first instance, a likely value for the minor axis of the ellipse formed on the beam splitter 4 (FIGS. 4 and 5) when the scanner 13 is in the angular position corresponding to zero O.P.D. and to carry out a trace of the principal rays passing through the respective extremities of the estimated minor axis as the scanner is "swung" first to one scan limit ($L_{max+}$) and then to the other ($L_{max-}$), in order to find the respective intersects with the beam splitter 4 at said limits. The trace will, of course, account for the different angles of incidence in the presence of the compounding effect of the translation of the ellipse over the face of the beam splitter 4 caused by the rotation of the scanner 13 around an axis that is offset from the major axis of the ellipse.

Now, the area of the beam splitter 4 is minimized if the intercepts referred to and the extremities of the major axis lie on the same circle. This is tantamount to saying that the distance between the intercepts must set the length of the major axis. If the simple equation:

$$\pi \cdot a \cdot b = A$$

wherein
 a = major semiaxis
 b = minor semiaxis
 A = area of ellipse for required throughput
is met, the predicted value for the minor axis was correct. If not, the ray trace is repeated using a lower or higher value (whichever is suggested by the previous result) until an ellipse is found that meets the throughput requirement and allows the scanning range to be covered in a circular beam splitter of minimum area. A few iterations may be needed to achieve this.

Referring to FIG. 4 once again, it should be noted that the reason for imaging the elliptical aperture 17A onto the reversing mirrors 6 and 10, rather than the beam splitter 4 itself, is the excessive broadening of the beam returning to the beam splitter from the two reversing mirrors that would otherwise result. The ellipse the geometry of which is determined in the manner hereinbefore described is that produced by the returning beams, and although these must still diverge, by controlling the distance between each reversing mirror and the beam splitter, the broadening can be kept within limits that ensure an efficient utilization of the beam splitter area.

Once the ellipse has been defined, it is merely a matter of arranging the length of the optical paths between (a) the mirror 20 and the baffle plate 17 and (b) the mirror 20, the beam splitter 4 and reversing mirrors 6 and 10, respectively. In general, once the matching optical paths between the beam splitter 4 and the reversing mirrors 6 and 10, respectively, have been settled, one need only select the optical layout that will give conveniently scaled (e.g. demagnified) images of aperture 17A so that the patch of radiation produced on the beam splitter by the beams returning thereto from said images fits the ellipse calculated in accordance with the method described above.

Figure 7:
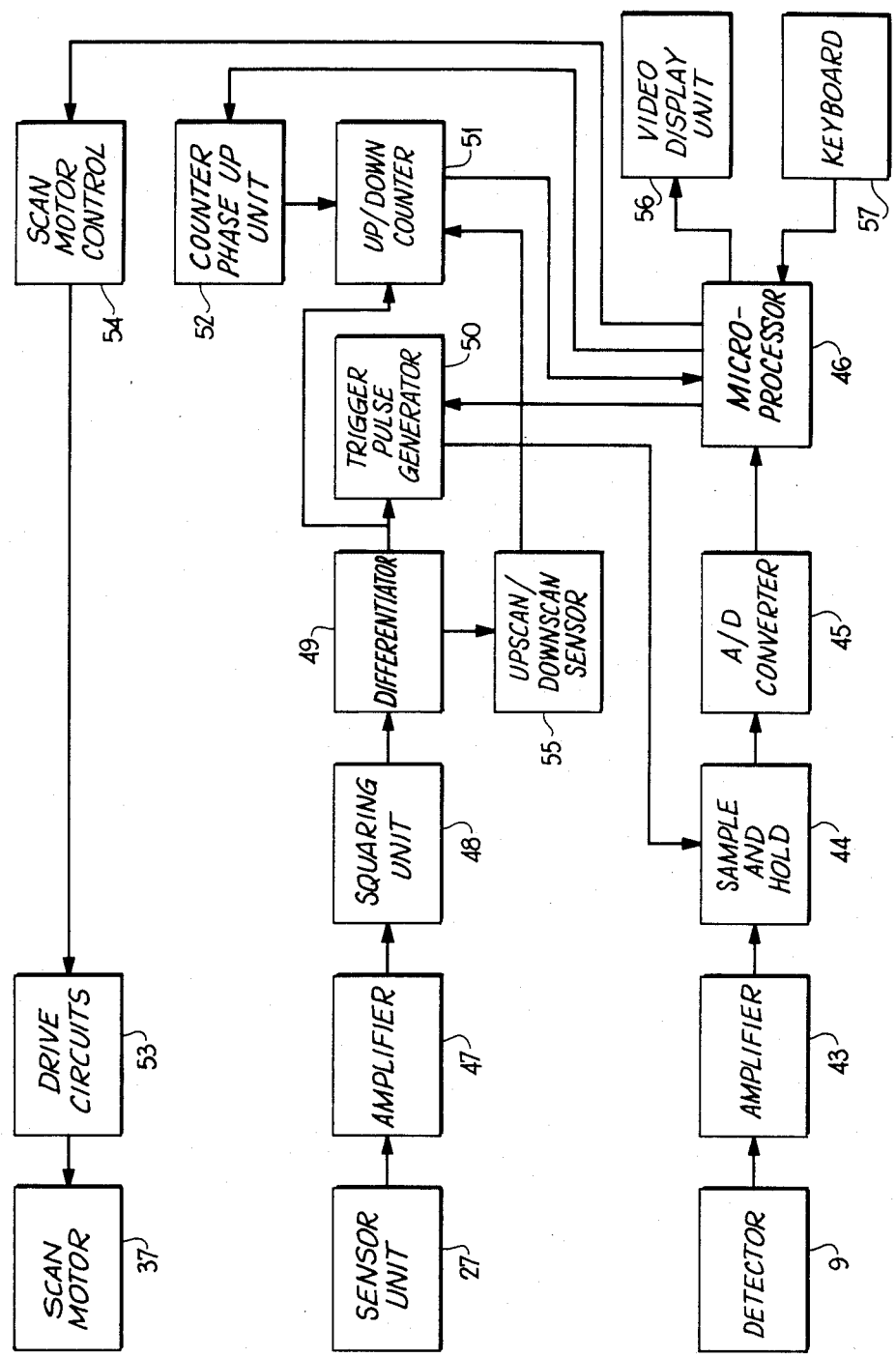
FIG. 7 is a block diagram of a microprocessor-based system for managing the FT-IR spectrophotometer described with reference to FIGS. 4 to 6.

Before introducing the block diagram of FIG. 7 illustrating the microprocessor-based system for managing the FT-IR spectrophotometer of FIGS. 4 and 5, it is thought desirable to dwell on certain generalities respecting the operation of the scanner 13, the reference interferometer based on the laser 25 and the acquisition of interferogram data points, in both downscanning and upscanning, for the purposes of digital processing. In the present context, the term downscanning (or downscan) denotes that the O.P.D. of the variable interferometric arm is being changed from $L_{max+}$ to $L_{max-}$ and upscanning (or upscan) that it is being changed from $L_{max-}$ to $L_{max+}$.

As indicated earlier, the scanner 13 reciprocates between two maximum retardation limits corresponding to angular positions which are symmetrical with respect to the angular datum position depicted in FIGS. 4 and 5, at which the O.P.D. is nominally zero.

The double-sided interferogram of the source 1, as modified by the sample in carrier 23, produced at each limit-to-limit scan is transduced into a time varying electrical signal waveform at the output of the detector 9. This analogue signal is, of course, unsuitable for digital processing without first undergoing analogue to digital conversion, which involves sampling the waveform at accurately repeatable O.P.D. scanning increments.

In the present embodiment, sampling is synchronized with the zero crossings of an electrical reference sine wave representing the interferogram of the laser 25 and each sampling point is constantly tracked through a counter so that successive values sampled at that point through repetitive scanning are always associated with the same counter reading and can therefore be accumulated at a digital storage location associated with said reading. In view of the scanning sequence adopted, a refinement is introduced to permit the counter to count up during upscanning and down during downscanning. The refinement consists in duplicating the reference sine wave with a 90 degree phase shift. This is achieved by the simple expedient of introducing the ⅛-wave plate 30 referred to earlier, which being traversed twice by the polarized beam from laser 25 acts on it as if it were a ¼-wave plate traversed once and, therefore, produces circular polarization of the laser beam. The original plane polarized sine wave is now accompanied by a sine wave of the same frequency 90 degrees apart. The polarizers 27D and 27E in unit 27 are crossed in such manner that the photosensors 27B and 27C, respectively associated with them, can each pass only the sine wave encountering a plane of transmission at the correct angle for access. The end result is that one optical sine wave is transduced in a related electrical sine wave by photosensor 27B and the other by photosensor 27C.

Figure 6:
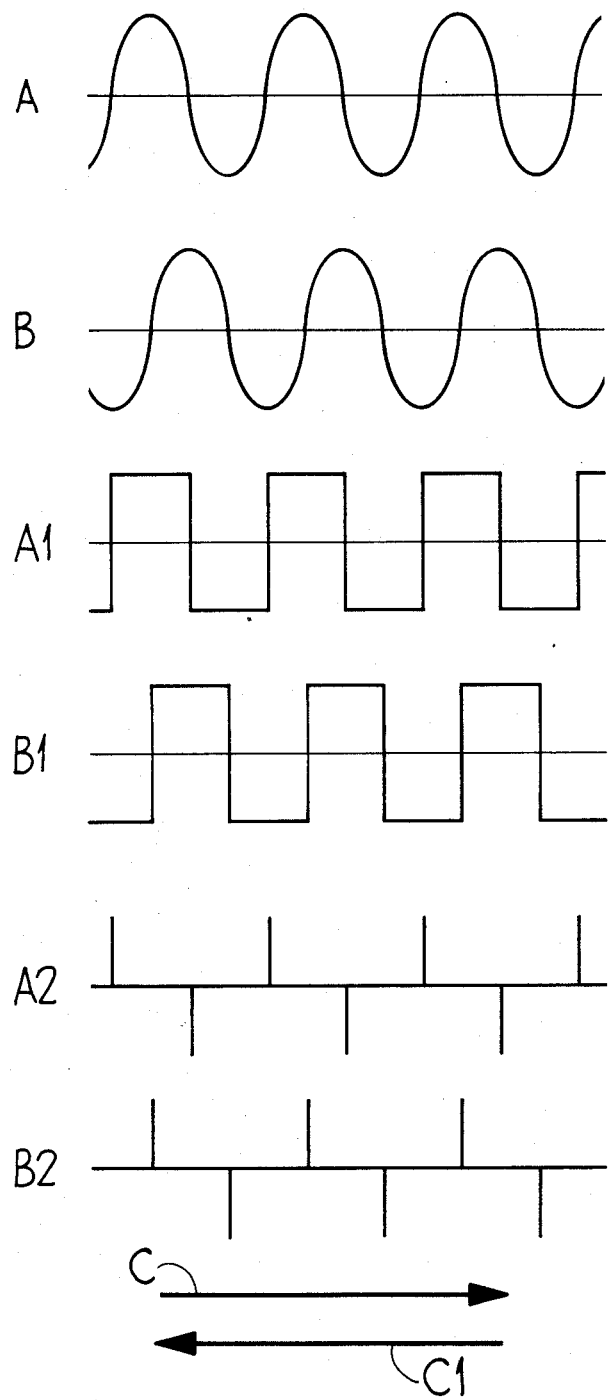
FIG. 6 refers to the FT-IR spectrophotometer of FIGS. 4 and 5 and illustrates how from a pair of electrical sine waves, each representing the interferogram of the reference laser beam incorporated in said spectrophotometer, waves are derived for timing the acquisition of data points from the interferogram of a spectrophotometric sample under analysis.

How the two electrical sine waves are used for the purpose of the present embodiment is now explained with reference to FIG. 6, wherein A and B represent the said sine waves, 90 degrees apart, A1, B1 the waves resulting from squaring them and A2, B2 those resulting from differentiating the square waves A1, B1. Now, each pulse occurring in A2 is used to control the sampling and processing of one data point and at the same time update a counter to be identified later with reference to the block diagram of FIG. 7.

Assuming that the phase relationship of A2 and B2 corresponds to a downscan as indicated by arrow C, then the occurrence of a positive pulse in B2 immediately following a positive pulse in A2 is sensed and used to decrement the counter. Conversely, a positive going pulse in A2 is not immediately followed by a like pulse in B2 is associated with an upscan (arrow C1) and the counter incremented.

Upon switching on the FT-IR spectrometer, the counter is zeroed at the first zero crossing in the A2 wave immediately following the peak of the centreburst in the interferogram of the analytical sample. Thereafter, and until the instrument is switched off, the counter keeps track of the sampling points in upscanning and downscanning.

The block diagram of FIG. 7 illustrating a microprocessor-based system for the control of the FT-IR spectrophotometer depicted in FIGS. 4 and 5 will now be described.

In FIG. 7, the signal from detector 9, amplified by amplifier 43, is fed into sample and hold unit 44 and each sampled value is routed to analogue-to-digital converter 45 feeding into microprocessor 46. The output of unit 27, consisting of two sine waves 90 degrees apart, as described earlier, is passed through an amplifier 47, after which each sine wave is squared in unit 48. Each resulting square wave is differentiated in differentiator 49. One output of differentiator 49, corresponding to differentiated wave A2 (FIG. 6), is used in trigger pulse generator 50 to activate at each peak, regardless of polarity, the sample and hold unit 44 under the control of microprocessor 46 and the same output is extended to up and down counter 51.

When the FT-IR spectrophotometer is first switched on, the counter 51 must be zeroed correspondingly to a predeterminedly fixed angular position of scanner 13 (FIGS. 4 and 5) in order that it may thereafter keep track of all sampling points until the instrument is switched off. This achieved through a counter phase up unit 52, which at a time when the microprocessor 46 determines that the maximum level in the amplitude of the centreburst of the sample interferogram has been reached sets the counter 51 to count from the next peak of the differentiated wave A2 in unit 49 that also supplies an input to the trigger pulse generator 50, as stated earlier.

The scan motor 37 energized by drive circuits 53 responsive to scan motor control 54 is continuously steered in operation by the microprocessor 46 through the said scan motor control 54, the actual count in counter 51 determining the scan action to be taken. Changes in scan direction are sensed by upscan/downscan sensor 55, to which counter 51 responds by making the appropriate change in counting direction.

It can now be readily appreciated that each of the retardation limits must correspond to a definite and immutable counter reading. When the microprocessor 46 detects that reading, it sends a reverse signal to the scan motor control 54 and, at the same time, interrupts the processing of data points. The scan motor 37 begins its reversal procedure and the counter keeps on counting. When the count is restored to that obtaining when data processing was interrupted, the processing of data is resumed until the sampling point corresponding to the opposite retardation limit is reached, when the reversal operation is again carried out. The scan overruns by a few dummy sampling points past a retardation limit and, when the motor actually stops and reverses, the counter decrements (if before reversal upscanning was operative) or increments (if downscanning was operative) by the same number of counts as the number of sampling points overrun.

It is important to observe that by keeping track of sampling points through up and down counter 51 data points may be accumulated in upscan and downscan and correctly routed to their respective memory locations for signal averaging of data recurring at the same sampling points in successive interferograms. In addition, the scan motor reversal procedure is greatly simplified.

A video display unit 56 linked to the microprocessor 46 is included to enable the user to examine a display of sample interferograms and spectra, as well as other data. The Fourier Transform mathematical process is carried out by the microprocessor 46 which is programmed to respond to instructions keyed in by the user on the keyboard 57.

It is to be understood that in the context of the present disclosure the term "light" includes the "invisible" regions of the light spectrum.

By incorporating a rotary O.P.D. scanner in accordance with the present invention in an FT-IR spectrophotometer as described, it has been possible to realize an instrument that is accurate, simple, comparatively inexpensive and highly reliable.

I claim:

1. Interferometric apparatus comprising:
   (a) a rotary O.P.D. scanning assembly mounting a mirror pair formed by a beam splitter and a folding mirror, said beam splitter having a semi-reflective beam-splitting layer one face of which is the optical input surface in accurately parallel face-to-face relationship with said folding mirror and the other the output surface;
   (b) two stationary reversing mirrors co-operating with said mirror pair for defining two interferometric arms, each arm receiving one of the two beams resulting from the splitting of an input beam by the beam splitter, for rotationally scanning successive O.P.D. values between the two beams up to a predetermined maximum, and for recombining the beams at said output surface so that they emerge therefrom as a single beam directed along an output path;
   (c) an output mirror mounted at right angles to the output surface of said beam splitting layer, said output mirror being borne by the scanning assembly and positioned to receive the output beam; and
   (d) pivotal means arranged to ensure that the scanning assembly rotates around an axis substantially coincident with the line of intersection of the prolongation planes of the semi-reflective beam-splitting layer and the face of the output mirror, respectively.

2. Apparatus as claimed in claim 1, wherein the beam splitter has an effective area of generally circular configuration and said apparatus further comprises optical beam control means for projecting onto said input surface an input beam the cross-sectional area of which is an ellipse, the minor axis of the ellipse being chosen so that the distance separating the intercepts of the minor axis extremities with the input surface at two opposite predetermined angular travel limits of the scanning assembly is close to the length of the major axis and at the same time the said cross-sectional area is adequate to provide the desired optical throughput of the apparatus.

3. Apparatus as claimed in claim 2, wherein said apparatus includes a source of light for producing said input beam and the optical beam control means comprise image forming means and a baffle which are located between the source and the beam splitter, the baffle having an elliptical aperture the major and minor axes of which together with the optical arrangement of the image forming means are such that the major and minor axes of the largest projection of said aperture on the semi-transparent layer are approximately equal to the desired major and minor axes, respectively, of the ellipse.

4. Apparatus as claimed in claim 1, wherein the O.P.D. scanning assembly is a pivoted integral casting supporting in predetermined spaced relation the folding mirror, the beam splitter and the output mirror.

5. Apparatus as claimed in claim 4, including a housing in the form of another integral casting wherein the O.P.D. scanning assembly is pivotally mounted, the two stationary reversing mirrors being fixed to said housing.

6. Apparatus as claimed in claim 5, wherein in the operative attitude of the apparatus the axis of rotation of the O.P.D. scanning assembly is generally vertically oriented, said axis spanning an upper and a lower pivotal connection between the two castings, the upper connection comprising a cylindrical member fixed to one casting radially biassed into a V-shaped bearing provided in a member fixed to the other casting.

7. Apparatus as claimed in claim 6, wherein the lower pivotal connection is of the type wherein by virtue of its own weight the pivoted casting creates a centralizing force component restraining all radial movement thereof as mechanical wear takes place.

8. Apparatus as claimed in claim 1, including a base plate and a housing for said O.P.D. scanning assembly resiliently mounted on said base plate.

9. Apparatus as claimed in claim 8, wherein a photosensitive device is attached to the base plate for receiving the output beam from the output mirror.

10. Apparatus as claimed in claim 1, wherein the semi-reflective layer is held between two rigid supports transparent to the input beam and having identical optical characteristics.

11. Apparatus as claimed in claim 1, wherein the semi-reflective layer is supported on a thin taut film transparent to the input beam.

12. Apparatus as claimed in claim 1, wherein the semi-reflective layer is a specular foraminous structure, which is semi-reflective by virtue of the lack of reflection from the open spaces in said structure.

13. Apparatus as claimed in claim 12, wherein said structure is self-supporting.

14. Apparatus as claimed in claim 12, wherein said structure is supported on a transparent taut film.

15. Apparatus as claimed in claim 14, wherein said structure is in the form of a layer vacuum evaporated on said film.

16. Apparatus as claimed in claim 1, wherein said apparatus is an FT spectrophotometer including a Michelson-type interferometer and a detector for receiving the output beam and transducing the optical interferograms conveyed by said beam into an electrical representation.

17. Apparatus as claimed in claim 16, comprising; a reference interferometer, incorporated within the Michelson-type interferometer, having a laser source for providing a narrow, plane-polarized, monochromatic beam; means for directing the laser beam through the O.P.D. scanning assembly along a path shared with the input beam, split beams and output beam up to and including a portion of the output path emerging from the output mirror; means for diverting the laser beam past the output mirror into a path distinct from the remainder of the output path leading to the detector; means for circularly polarizing the laser beam and thus producing two optical interferograms of the laser beam 90 degrees apart; a two-channel photoelectric transducer for transducing the said optical interferograms, one in each channel, into corresponding electrical sine waves 90 electrical degrees apart keyed to the angular travel of the scanning assembly; means for utilizing the sine waves for controlling the acquisition timing of data points from the detector output representing an analytical interferogram; and means for performing the Fourier Transform of the analytical interferogram and thus producing an electrical representation of the spectrum of a sample under analysis.

* * * * *